US009036080B2

(12) United States Patent
Miyawaki

(10) Patent No.: US 9,036,080 B2
(45) Date of Patent: May 19, 2015

(54) APPARATUS AND METHOD FOR ACQUIRING INFORMATION ABOUT LIGHT-FIELD DATA

(75) Inventor: Mamoru Miyawaki, Tucson, AZ (US)

(73) Assignee: Canon Kabushiki Kaisha, Tokyo (JP)

( * ) Notice: Subject to any disclaimer, the term of this patent is extended or adjusted under 35 U.S.C. 154(b) by 252 days.

(21) Appl. No.: 13/603,294

(22) Filed: Sep. 4, 2012

(65) Prior Publication Data

US 2014/0063332 A1 Mar. 6, 2014

(51) Int. Cl.
*H04N 5/225* (2006.01)
*H04N 5/232* (2006.01)
*H04N 5/33* (2006.01)
*G03B 13/20* (2006.01)
*G03B 35/10* (2006.01)

(52) U.S. Cl.
CPC ......... *H04N 5/2254* (2013.01); *H04N 5/23232* (2013.01); *H04N 5/33* (2013.01); *G03B 13/20* (2013.01); *G03B 35/10* (2013.01)

(58) Field of Classification Search
CPC .................................................. H04N 13/0282
USPC .................................. 348/335, 340, 373–376
See application file for complete search history.

(56) References Cited

U.S. PATENT DOCUMENTS

| 6,288,384 | B1 | 9/2001 | Bahnmueller et al. |
| 7,119,842 | B2 | 10/2006 | Seo |
| 7,936,392 | B2 | 5/2011 | Ng et al. |
| 7,965,936 | B2 | 6/2011 | Raskar et al. |
| 8,229,294 | B2 | 7/2012 | Agrawal et al. |
| 2007/0121468 | A1 | 5/2007 | Koyama et al. |
| 2010/0026852 | A1 | 2/2010 | Ng et al. |
| 2010/0141802 | A1 | 6/2010 | Knight et al. |
| 2011/0019184 | A1* | 1/2011 | Iwane ........................... 356/123 |
| 2011/0032337 | A1 | 2/2011 | Ramos et al. |
| 2011/0080491 | A1* | 4/2011 | Drazic et al. ............... 348/222.1 |
| 2011/0128412 | A1 | 6/2011 | Milnes et al. |
| 2011/0235048 | A1 | 9/2011 | Wang et al. |
| 2012/0019821 | A1 | 1/2012 | Chen et al. |

* cited by examiner

*Primary Examiner* — Timothy J Henn
(74) *Attorney, Agent, or Firm* — Canon USA Inc IP Division

(57) ABSTRACT

An apparatus to acquire information about light-field data includes: a beam splitter configured to split light, through a lens unit which is connected to the apparatus, from an object into a first light beam and a second light beam; an image sensor configured to detect the first light beam to form an image of the object; and a light-field sensor, including a lenslet array and a detecting unit to detect the second light beam through the lenslet array, configured to acquire information about the light-field data, the lenslet array including a plurality of lenslets, wherein a first position where the detecting unit is provided is conjugate to a second position of a pupil of the lens unit.

24 Claims, 11 Drawing Sheets

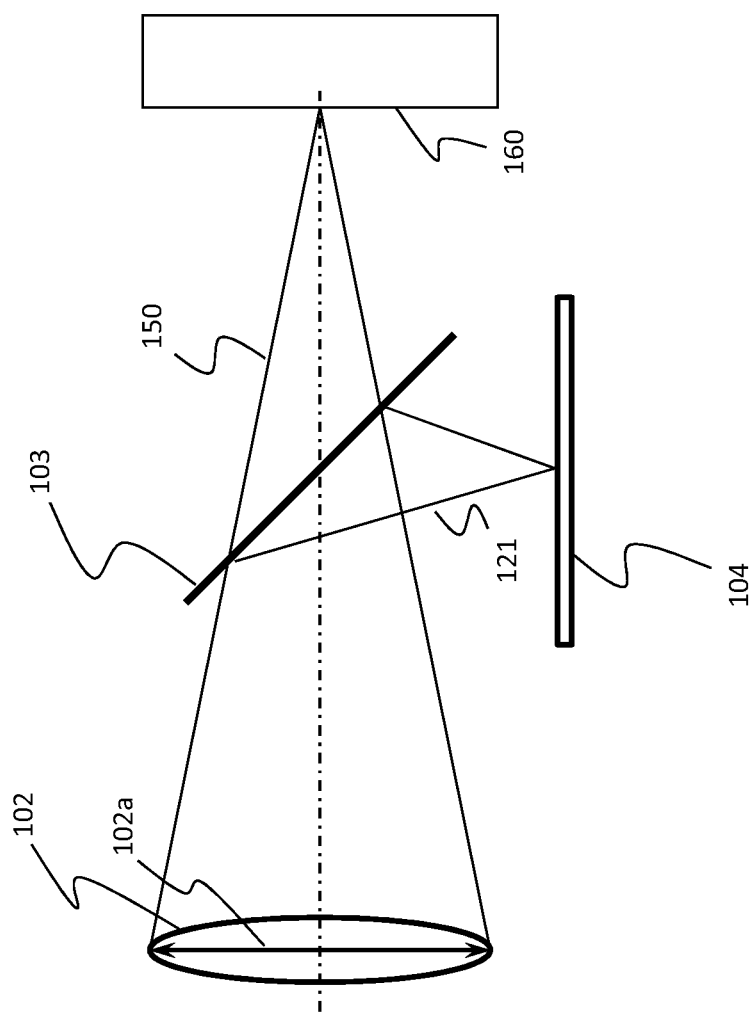

APPARATUS AND METHOD FOR ACQUIRING INFORMATION ABOUT LIGHT-FIELD DATA

BACKGROUND OF THE INVENTION

1. Field of the Invention

In one aspect, the present invention is related to an apparatus and a method for acquiring information about light-field data and especially related to a light-filed camera.

2. Description of the Related Art

A light-filed camera is disclosed in U.S. Pat. No. 7,936,392. By using a micro-lens (i.e. lenslet) array and a photo-sensor array, the light-field camera can not only capture how much light accumulates at each spatial location on an image plane, but also obtain information about a direction from which the light arrived at the micro-lens array.

The micro-lens array is placed in front of the photo-sensor array along an optical axis to sample data related to the direction of the light. The accuracy of the direction depends on a state of an image formation on the photo-sensor array.

Due to a zooming operation, when the state of the image formation is changed, the change may cause the deterioration of the accuracy.

SUMMARY OF THE INVENTION

Embodiments of the present invention provide an apparatus and a method for.

According to an aspect of the present invention, it is provided that an apparatus to acquire information about light-field data comprising: a beam splitter configured to split light, through a lens unit which is connected to the apparatus, from an object into a first light beam and a second light beam; an image sensor configured to detect the first light beam to form an image of the object; and a light-field sensor, including a lenslet array and a detecting unit to detect the second light beam through the lenslet array, configured to acquire information about the light-field data, the lenslet array including a plurality of lenslets, wherein a first position where the detecting unit is provided is conjugate to a second position of a pupil of the lens unit.

According to another aspect of the present invention, it is provided that a method to acquire information about light-field data comprising: splitting object light, passing through a lens, unit, into a first light beam and a second light beam; detecting the first light beam to capture an image of the object; inputting the second light beam into a lenslet array including a plurality of lenslets; scanning a spatial light modulator associated with each lenslet of the lenslet array, wherein the spatial light modulator is moved according to a zooming operation of the lens unit so that a conjugate relationship between a position of a pupil of the lens unit and a position of the spatial light modulator is maintained; and detecting the second light beam coming through the spatial light modulator to acquire information about light-field data of the object.

Further features of the present invention will become apparent from the following description of exemplary embodiments with reference to the attached drawings.

BRIEF DESCRIPTION OF THE DRAWINGS

FIGS. 2A and 2B are for explaining arrangements of a light-field sensor.

DESCRIPTION OF THE EMBODIMENTS

Embodiments according to the present invention will be described below with reference to the attached drawings.

Figure 1:
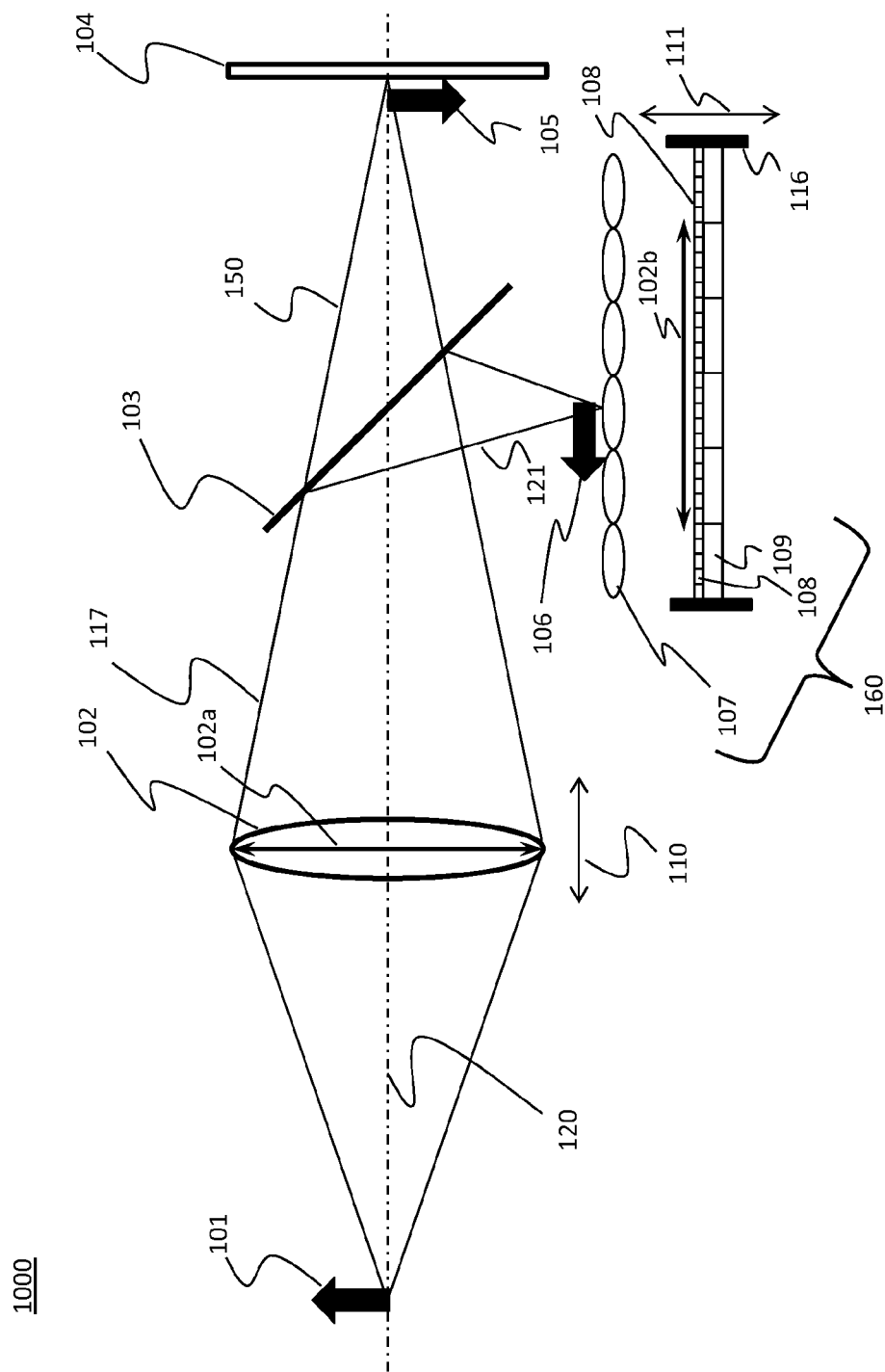
FIG. 1 illustrates one embodiment of a light-field data acquisition device.

A configuration of a light-field data acquisition device 1000 is illustrated in FIG. 1. A lens unit 102 for forming an image of an object 101 and an image sensor 104 are placed along an optical axis 120. In the device 1000, the lens unit can include a plurality of lenses for, for example, an auto-focusing function and a zooming function. The lens unit 102 is drawn as one lens in FIG. 1 for abbreviation.

A reference 102a denotes a pupil of the lens unit. The pupil is an image of an aperture stop of the lens unit 102. The pupil 102a may be called an exit pupil technically. The lens unit 102 is related to resolution and field angle of the lens unit of the device 1000.

A beam splitter 103 (e.g., dichroic beam splitter, 50:50 beam splitter, 80:20 beam splitter, 90:10 beam splitter, and polarization beam splitter) can separate radiation 121 (e.g., near infrared radiation, infrared radiation, ultraviolet radiation, visible light) from light 117 as illustrated in FIG. 1. Light 150 passing through the beam splitter 103 can be detected by the image sensor 104 and a separated (reflected, deflected) radiation 121 can impinge on a lenslet array 107 in FIG. 1. The beam splitter 103 may split the light 117 into visible light for the image sensor and near infrared light for a light-field sensor 160 which includes a lenslet array 107 and a detecting unit. The detecting unit can include a spatial light modulator (hereinafter, SLM) 108 and a detector 109. Instead of using the SLM 108 and the detector 109 (such as a photo detector), an image sensor array (e.g., a CCD array, a CMOS array) can be used.

The beam splitter 103 may split the light from the object 101 into 80% visible light of the light 117 to be detected by the image sensor 104 and 20% visible light of it to be detected by a detecting unit 160, for example. Such beam splitter is described as '80:20 beam splitter' above.

The separated radiation 121 can be detected by using the SLM 108 and a detector 109 (e.g., a photo detector) as the detecting unit. The SLM 108 has a plurality of pixel groups. Each pixel group may be associated with each lenslet of the lenslet array 107 to obtain information related to light-field data of the object 101, by using the detector 109. Every pixel group of the SLM 108 can be driven independently. The SLM can be an LCD (liquid crystal device) or a DMD (digital micro-mirror device), for example.

The light-field sensor 160 can include the lenslet array 107 and the detecting unit, such as an image sensor array or a combination of the SLM 108 and the photo detector 109. Following configurations can be available for example. (a)

The image sensor 104 detects visible light and the light-field sensor 160 also detects visible light. (b) The image sensor 104 detects visible light and the light-field sensor 160 detects near infrared radiation and/or infrared radiation and/or ultraviolet light.

Figure 2A:
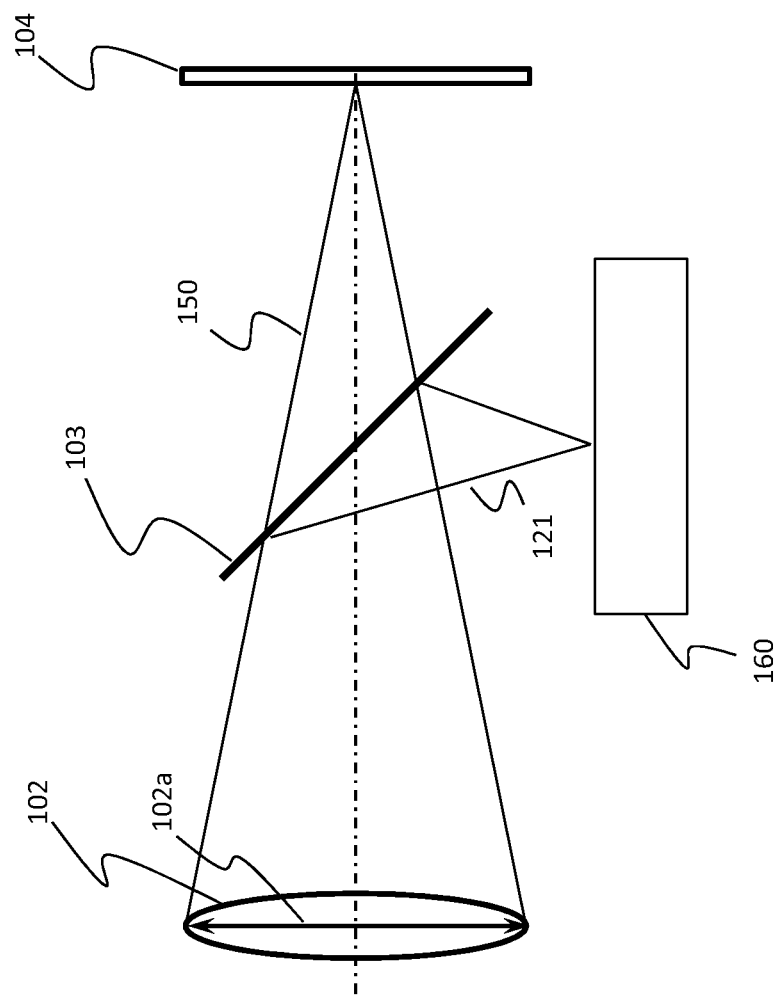

As shown in FIGS. 2A and 2B, the separated radiation 121 can be detected not only by the light-field sensor 160, but also by the image sensor 104. Hereinafter, a system configuration of FIG. 2A is exemplarily explained with FIG. 1, the visible light is used as one example of the light to be detected by the image sensor 104, and the near infrared light is used as one example of the separated light 121.

Visible light (150) which passes through the beam splitter 103 can be detected by the image sensor 104 which is on the image plane. Near infrared radiation (121) which is reflected by the beam splitter 103 can impinge on the lenslet array 107 and light coming from the lenslet array 107 can be detected by the detector 109 through the SLM 108. In the present embodiment, the visible light is used for capturing how much light accumulates on the image plane by using the image sensor 104, and the near infrared radiation 121 is used for obtaining information about a direction of the light which arrives at the pupil 102a of the lens unit 102 coming from the object 101.

An image 105 of the visible light (150) and an image 106 of the near infrared radiation (121) are formed and focused on the image sensor 104 and the lenslet array 107, respectively. A length between the beam splitter 103 and the lenslet array 107 can be the same as the length between the beam splitter 103 and the image sensor 104. Each element (e.g., the lenslet array 107, the SLM 108, and the photo sensor 109) is illustrated at each reduced scale in FIG. 1. A position of the SLM 108 is set to be conjugate with a position of the pupil 102a of the lens unit 102. An image at the pupil 102a is formed on the SLM 108 as illustrated in FIG. 1. A reference 102b denotes the image, corresponding to the pupil 102a, formed on the SLM 108. To form an image of the pupil 102a on the SLM 108, a power and an effective position of an effective lens, which can be composed of the lenslet array 107 and a lens located at the exit side of the lens unit 102, can be obtained by paraxial theory. The SLM 108 can be placed at the effective position. A pupil plane where the pupil 102a is formed can be conjugate with the SLM 108 or the detecting unit. Instead of the above conjugate relationship, a position of the SLM 108 might be set to be conjugate with a position of one main lens of the lens unit 102, and information about a direction of the light at the main lens may be acquired.

While the pupil plane of the lens unit 102 shifts along the optical axis 120 according to a zooming operation, the image 105 can be continuously formed on the image sensor 104 by keeping an optical conjugate relationship between the object 101 and the image 105. The information about the formed image 105 can be detected by the image sensor 104, and the detected information can be stored in a memory.

The near infrared radiation (121) reflected by the beam splitter 103 can be detected by the detector 109 (e.g., a photo detector) via the lenslet array 107 and the SLM 108.

The near infrared radiation (121) on the pupil 102a of the lens unit 102 can be designed to be conjugated with the SLM 108, and form an image on the lenslet array 107. The detector 109 can be irradiated by light which forms the image on the lenslet array 107, through the SLM 108. A state of the irradiation on the SLM 108 corresponds to an angle of a beam from the lenslet of the lenslet array 107, and the angle of the beam from the lenslet corresponds to an angle of the separated near infrared radiation 121 which impinges on the lenslet.

An output angle from the lenslet can depend on an incident angle to the lenslet. The incident angle of the separated radiation 121 can depend on a position and a direction of the light coming from the object 101 on the pupil 102a. Light-filed data, such as the angle of the light, can be detected by the detecting unit and can be associated with the depth information of the object. The position and direction of the light on the pupil 102a depends on a position of a point of the object 101, that is, the depth information of the object 101.

Since an irradiated position on the detector 109 depends on an angle of the incident light 121 and the output angle, obtaining information about the irradiated position and its irradiation amount means knowing the position and angle (direction) of the near infrared radiation on the pupil 102a of the lens unit 102. Therefore, the angle of the light beam on the pupil 102a can be associated with the pixel of the SLM 108. An intensity of the light for each angle can be detected by the photo detector 109.

The photo detector 109 can be selected from a photo diode and a photomultiplier. The photo diode can be for visible light, ultraviolet light, infrared light, or near infrared light. In FIG. 1, a particular main lens and a particular lenslet array 108 are illustrated, but those skilled in the art will recognize that a variety of lenses and/or lenslet arrays, which are currently available or may be developed in the future, can be implemented with a similar approach by, for example, replacing the illustrated lens unit and/or lenslet array. In addition to the lens unit 102, other functional lens units can be added into this embodiment.

The SLM 108 comprises a plurality of pixels, and each pixel can be an opened state as an aperture and a closed state as a shutter. One lenslet can be associated with m*m pixels (e.g., 5×5 pixels). Since each lenslet can be regarded as a pinhole camera, a direction of a beam which impinges on a lenslet can be known by the information about which pixel(s) of m*m pixels is (are) irradiated. Angular distribution of the light beams impinge on the lens let array 107 can be obtained by scanning (changing) the aperture of the SLM 108.

In FIG. 1, the angle of the light from the object 101 is detected by the detector 109 through the lenslet array 107 and SLM 108, but it may be possible to change the order of positions of the lenslet and the SLM 108. In FIG. 1, the lenslet array 107 can be replaced with the SLM 108, and the SLM 108 can be replaced with the lenslet array 107.

The pupil 102a is drawn inside of the lens unit 102, but the pupil 102a may be located outside of the lens unit 102. While a position of the pupil 102a can move according to a zoom operation of the lens unit 102, the SLM 108 with the detector 109 can be moved according to the movement of the pupil of the main lens 102, in order to maintain the conjugate relationship between a position of the pupil 102a and a position of the SLM 108. The SLM can be moved by the actuator 116 according to the zooming operation so that a conjugate relationship between the pupil 102a and the detecting unit, which may include the SLM 108 and the photo detector 109, is maintained. A conjugate relationship between the pupil 102a and the SLM 108 can be maintained.

To move the SLM 108, an actuator 116 (e.g., a stepping motor, a micro-electro-mechanical system (MEMS), a voice coil motor, an ultrasonic motor, a piezoelectric motor) can be provided. According to the zooming operation, which may cause the shift of the pupil, an image of the pupil formed on the SLM 108 can be shifted. To follow the shift of the image, the SLM 107 can be shifted by the actuator 116 by a certain amount. The spatial light modulator 108 can be moved by the actuator 116 so as to be synchronized with a zooming operation.

A look-up table corresponding to shifting amount of the pupil plane may be used for calculating the shift amount of the SLM 108. When the SLM 108 is substantially combined with the detector 109, the detector 109 can also be shifted as the shift of the SLM 108.

When the lens unit 102 and a camera body, which may include the beam splitter 103, the image sensor 104, and a light-field sensor 160, can be separated each other, a controller can be in the camera body with a CPU and a memory. The camera body can detect that the lens unit is connected to the camera body and find which lens unit is connected. If the memory stores the look-up table, the controller can provide a specific shift amount of the SLM 108 based on the look-up table.

When the pupil 102a of the lens unit 102 moves in a range 110 according to the zooming operation, the SLM 108 having the detector 109 can be synchronized with the movement of the pupil by the actuator 116 within a range 111 to maintain the conjugate relationship between the position of the pupil 102 and the position of the SLM 108.

In this embodiment, a system for obtaining spatial information is independent of a system for obtaining angle information. Because of the independency, even if a position of the pupil 102a is changed, the conjugate relationship between the pupil and the SLM 108 can be maintained.

It is said that the obtaining both high spatial resolution and high angle resolution is difficult. However, the above disclosed imaging apparatus can provide with both high spatial resolution and high angle resolution because the light is split into two light beams. One is used for detecting the spatial information, and the other one is for detecting the angle information.

It is known that obtaining a photographic image from light-field data (e.g., f(u, v, x, y)) is possible by integrating all the rays reaching each point (x, y) of the light-field sensor and coming from each point (u, v) of a plane of the lens unit.

A process for acquiring light field data will be explained in detail below.

Figure 3:
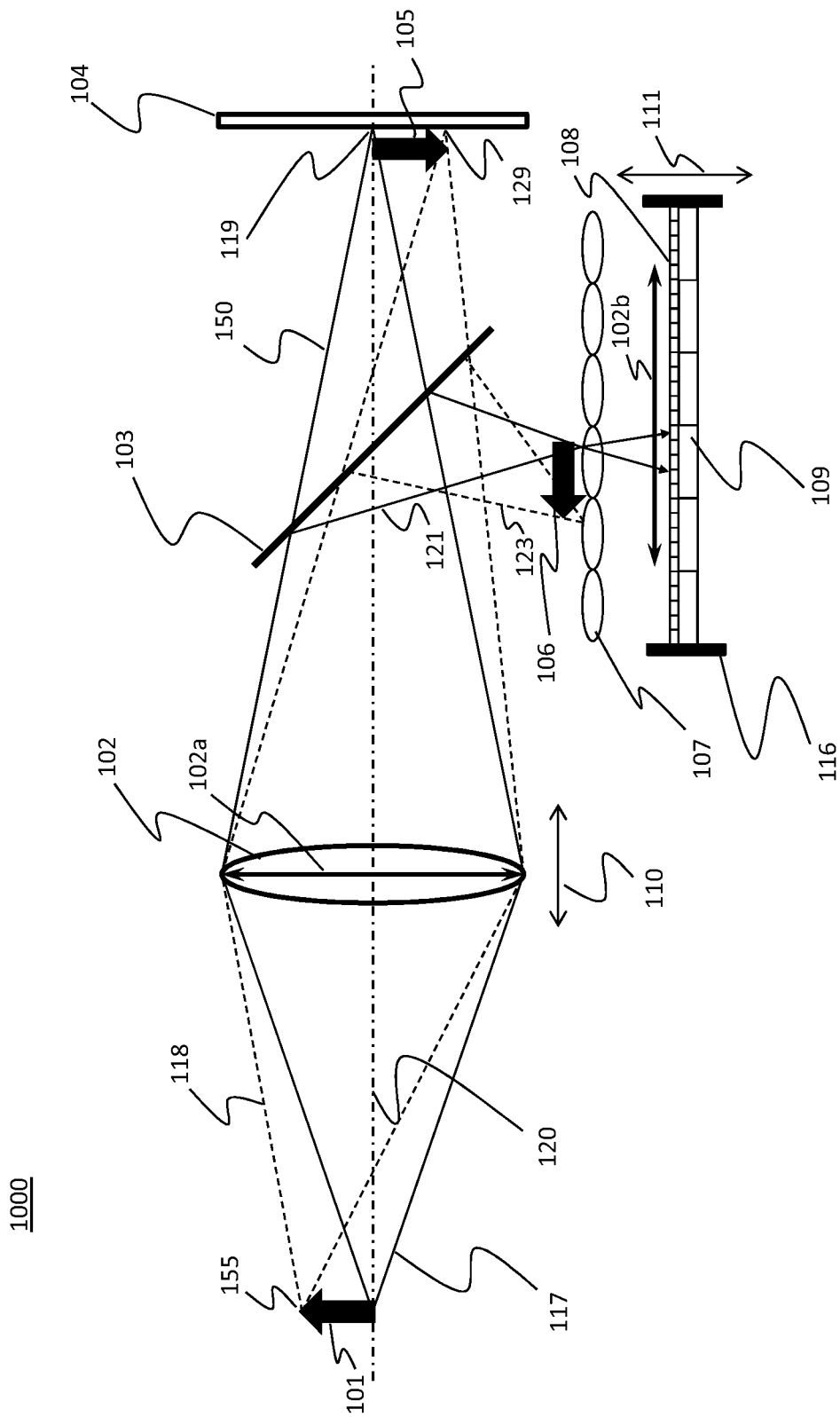
FIG. 3 illustrates one embodiment of a light-field data acquisition device.

In FIG. 3, the light arrives, through the lens unit 102 and the beam splitter 103, at the lenslet array 107. An image of the object 101 is formed on the image sensor 104 by the lens unit 102. Two kinds of light beams (i.e. on-axis light beam 117 and off-axis light beam 118) are described in FIG. 3. The on-axis light beam 117 is corresponding to the bottom of the object 101, and the off-axis light beam 118 is corresponding to the top of the object 101.

A plurality of visible light beams forms an object image on each pixel of the image sensor 104. On the other hand, the near infrared radiation impinges on the lenslet array 107. The near infrared radiation (121, 123) is composed of a plurality of angular components of beams on the pupil 102a, and impinges on the SLM 108 according to each angular component after being separated by the lenslet array 107.

In FIG. 3, a part of the on-axis light 117 from the object 101 is deflected (i.e. reflected) by the beam splitter 103, and input into the lenslet array 107 at various angles according to the angle of the light at the pupil 102a.

The deflected beam 121 of the on-axis light 117 is detected by the detector 109, and the detected signal can depend on the angle (direction) of the light at the pupil 102a. By scanning the aperture of the SLM 108, the light intensity at each angle of the pupil 102a can be sampled. Since an angle of the light at the pupil 102a can be associated with the pixel of the SLM 108, the angle information can be obtained by using the light intensity distribution.

On the other hand, an off-axis light 118 from the position 155 of the object 101 travels to the lens unit 102 and is deflected by the beam splitter 103. The deflected light 123 of the off-axis light 118 also can reach the detector 109 at a position with an angle different from an angle at a position where the on-axis light 118 arrives.

The height (length) or the position of the image 105 of the object 101 on the imaging sensor 104 can depend on an actual height of the object 101. The on-axis visible light 117 can travel to the sensor 104 at a position 119, and the off-axis visible light 118 can travel to a position 129 on the sensor 104.

Figure 4A:
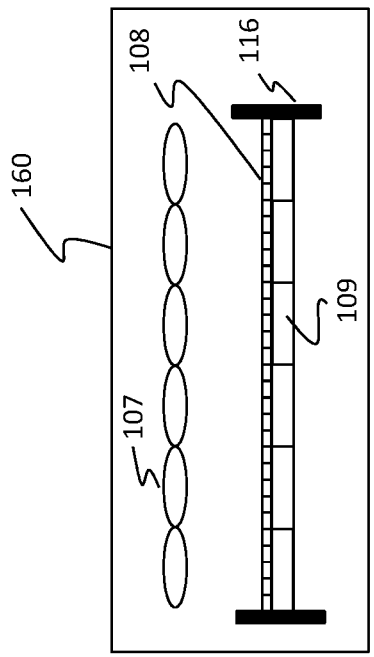
FIGS. 4A and 4B illustrate examples of an actuator to be used for moving a detecting unit.
Figure 4B:
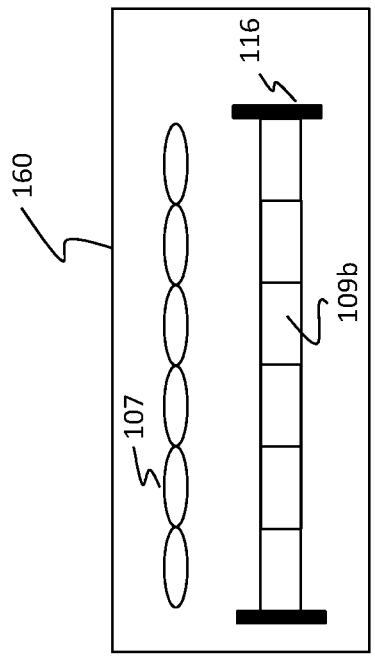

As described above, to maintain the conjugate relationship between a position of the pupil 102a and a position of the SLM 108 during the zooming operation, the actuator 116 can be used to move the SLM 108 having the detector 109 according to the movement of the pupil plane of the main lens 102. As illustrated in FIGS. 4A and 4B, the actuator 116 to move the detector 109 with the SLM 108 can be provided in the light-field sensor 160 and move an image sensor array 109b.

Since the position of the pupil may depend on the off axis angle, the pupil plane may not be a plane. In that case, the lenslet array may be bent according to the shape of the pupil plane. The power of each lenslet of the lenslet array 107 can be varied according to the shape of the pupil plane. The power of each lenslet is the optical magnifying power of each lenslet.

Figure 5:
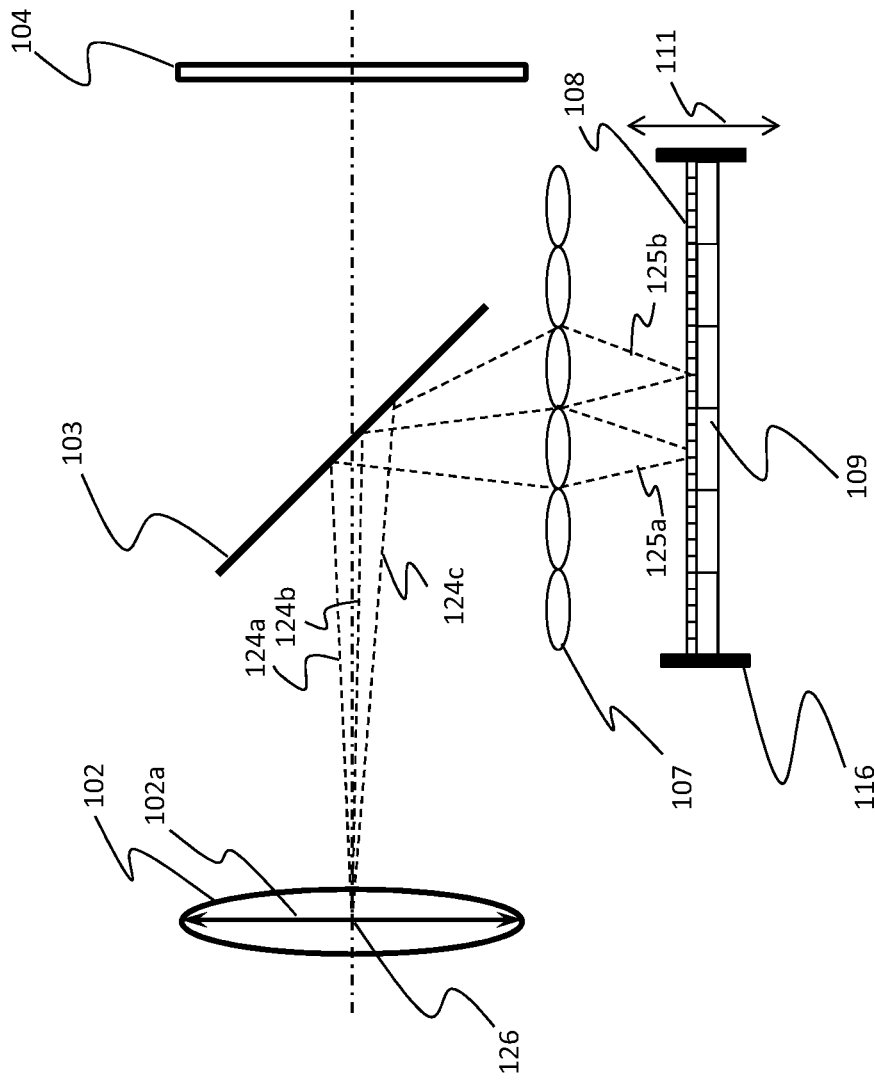
FIG. 5 illustrates one embodiment of a light-field data acquisition device.

The relation between the emitted flux (124a, 124b, and 124c) from the lens unit 102 and the focusing light on the detector 109 with SLM 108 are illustrated in FIG. 5. A plurality of fluxes (124a, 124b, and 124c) can have different angles from each other at the position 126 of the pupil 102a. The irradiating light 125a and 125b can be input to the detector 109 through each pixel of the SLM 108.

The irradiating positions on the detector 109 depend on the angle of flux (124a, 124b, and 124c) from the pupil plane 102. The incident angle into each lenslet in the lenslet array 107 may also depend on the height of the object 101. Therefore, we can obtain information about the angle of light as a function of the height of the object by measuring the position of irradiating light on the detector 109.

Figure 6:
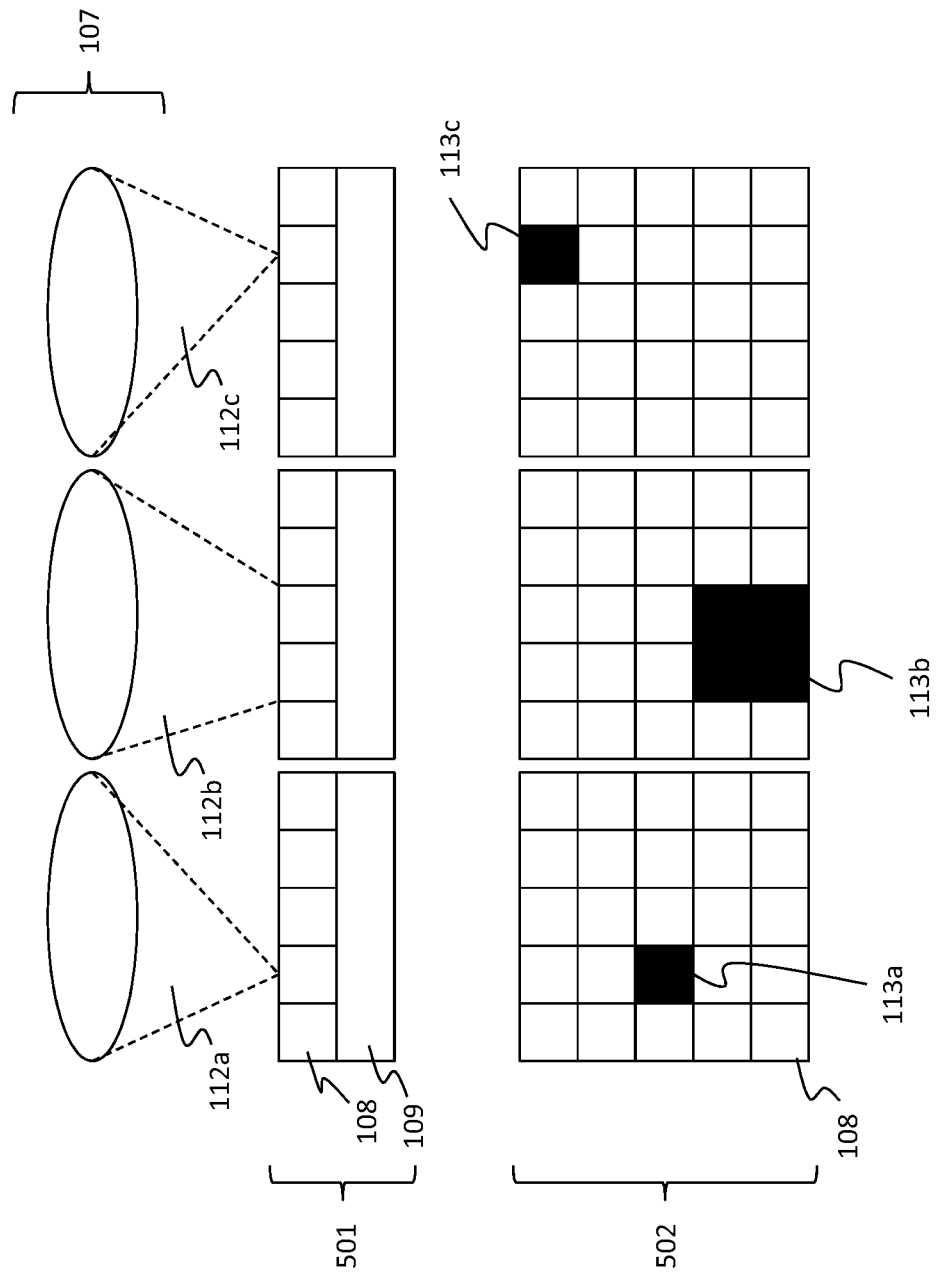
FIG. 6 illustrates lateral and top views of a spatial light modulator.

As illustrated in FIG. 6, the near infrared radiations 112a, 112b, and 112c can be input into the detector 109 through the lenslet array 107. The cross-sectional view 501 and the top view 502 of the programmable SLM 108a (108b) are illustrated. The irradiated spots 113a, 113b, and 113c are described in the top view 502 of the SLM 108. By using the information about the position and the profile of the irradiated spots, the angle of the light impinges on each lenslet, which is corresponding to the incoming light at the pupil plane, can be obtained.

A conventional plenoptic camera (light-field camera) has a micro-lens array before an image sensor. When one micro-lens is corresponding to 5×5 pixels of the image sensor, angle information can be detected by using the 5×5 pixels. Since an image of the 5×5 pixels is regarded as one unit of the spatial information, the image resolution can be deteriorated. However, the present embodiment described above, the image resolution can be maintained.

Figure 7:
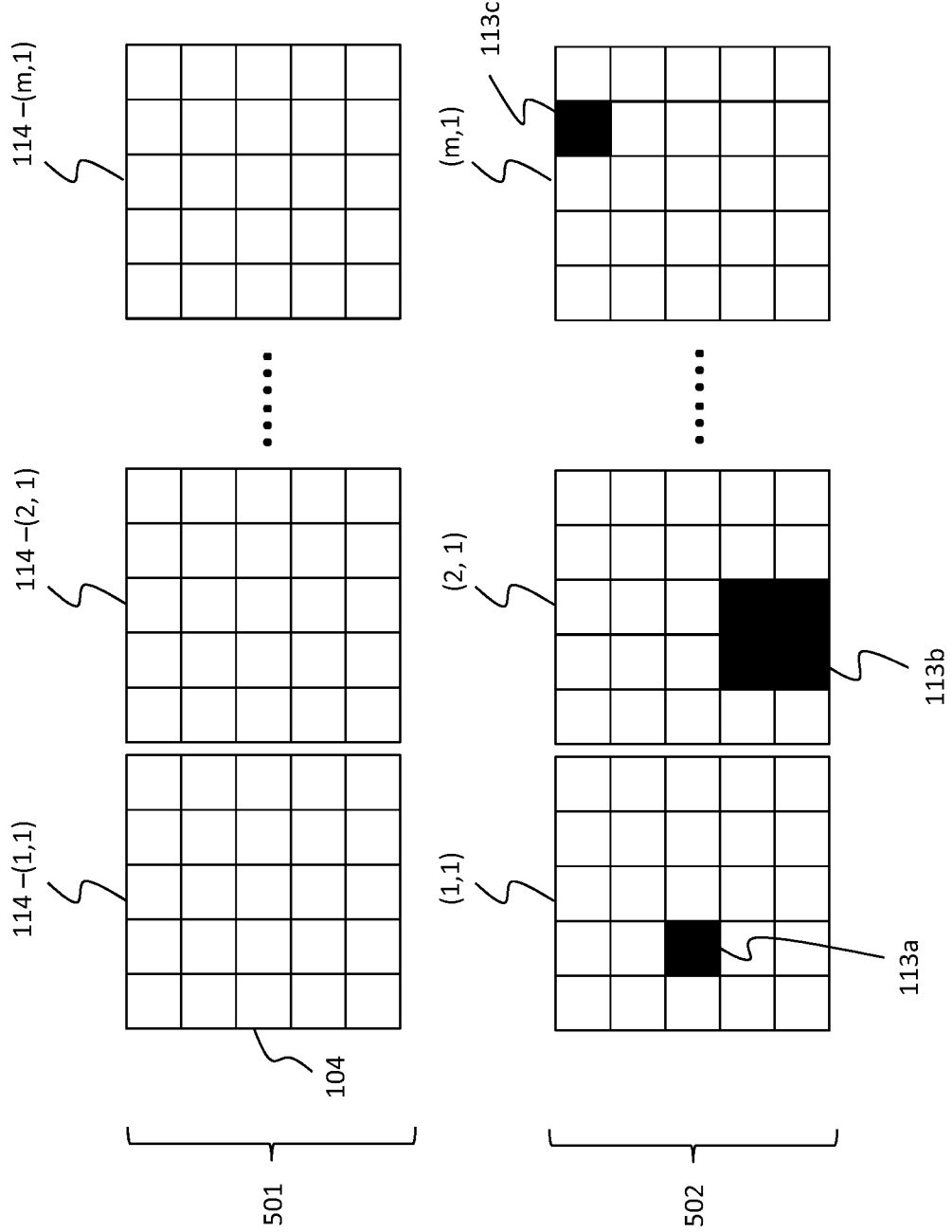
FIG. 7 illustrates a top view of a spatial light modulator.

In FIG. 7, the upper chart 501 describes a part of the pixels of the image sensor 104, and a reference number 114-(m, 1) denotes the block of 5×5 pixel in the image sensor 104 corresponding to the coordinate (m, 1) of the lenslet.

A lower chart 502 describes a part of the pixels of the SLM 108. A reference number 113a, 113b, and 113c denote the irradiated spots on the SLM 108. Based on the information about the focusing spots, the angle information can be calculated. One angle may be acquired by using 5×5 pixels, but one spatial data (i.e. image information) still can be detected by using one pixel.

By using the configuration as illustrated in FIG. 1, the image sensor 104 and the lenslet array 107 can be located at the same optical conjugate position to the object 101. When the size of an image on the image sensor 104 is the same as the size of an image on the lenslet array, the image on the lenslet array can be associated with the image on the image sensor 104 at each pixel.

In the case of a digital camera having a large number of pixels such as over 1M pixels, an image field covered by a specific 5×5 pixel block is so limited that we may usually see only one object in the 5×5 pixel block. In this situation, the angle of the optical flux into the above specific 5×5 pixel block is specified and one angular data can be assigned to the 5×5 pixels. The angular data is same for each pixel of the 5×5 pixel block. In a first embodiment of the present invention, there is a one to one relationship between individual lenslets and pixels of the image sensor 104. In a second embodiment of the present invention, an individual lenslet is associated with a plurality of pixels of the image sensor 104. In a third embodiment of the present invention, a plurality of lenslets are associated with individual pixels of the image sensor 104.

The angular resolution can depend on the number of pixels of the SLM and the number of lenslet pixels.

The lenslet and SLM can be optimized. Since the angular resolution of the human eye is relatively lower than the spatial resolution, even if the spatial data and angular data are measured separately as described above, the average of the angular data can be used as the angular data for a specific 5×5 pixels.

The correspondence between the coordinate data (i.e. spatial information) and angular data is explained below.

In the case of capturing a moving object, the angular data is more sensitive than the coordinate data. The signal of the coordinate information for the specific time, such as 1/60 sec. can be accumulated in a memory.

On the other hand, the depth data at the edge of the moving object can change rapidly for the above accumulation time such as 1/60 sec. Therefore, the accuracy of the angular data can be degraded for such accumulation time due to the mixed angular data. It means that the change speed of the angular data, corresponding to the movement of the object, can be faster than that of the coordinate information.

Angular data should be acquired for a shorter period in comparison with an acquiring period of the coordinate data. An SLM is able to do the faster sampling instead of the image sensor. The SLM can be selected, for example, from an LCD (Liquid Crystal Device), a DMD (Digital Micro-mirror Device), and an SLM based on EO (Electro-Optic) polymers in light of the wide optical bandwidth, a room temperature stability, and potential for high-speed performance.

The angular data can be integrated with the coordinate data by the following method. The angular data $a_{11}$ of the block of lenslet coordinate (1, 1) can be used for the coordinate data of $x_{ij}$ (i=1 to 5, j=1 to 5) for a prescribed period.

Since the sampling of the angular data can be faster than that of the coordinate data, the angular data can correspond to the interpolated coordinate data.

Figure 8:
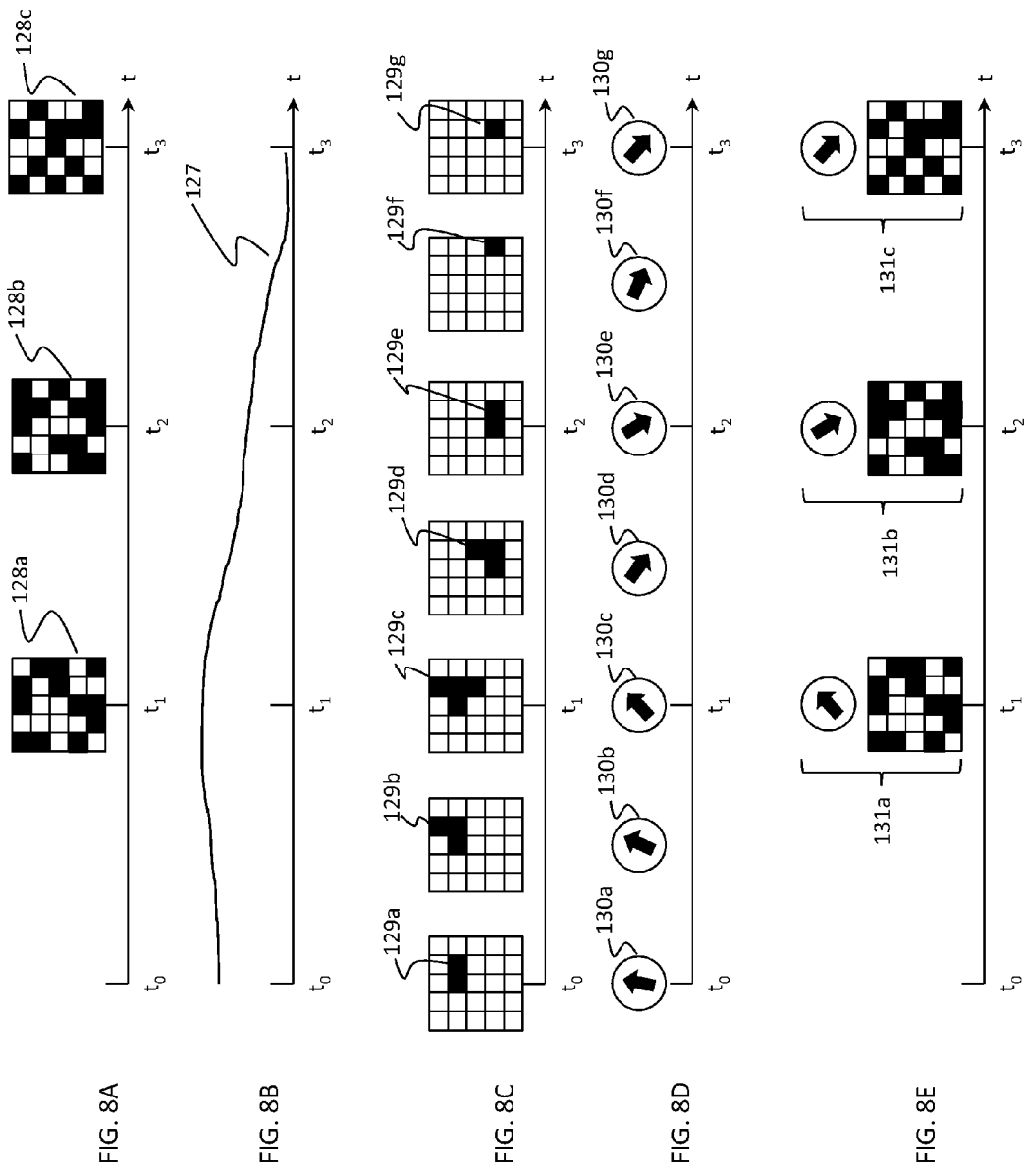
FIGS. 8A through 8E are for explaining a relation between an image detected by an image sensor and light-field data detected by a detecting unit.

Image data (128a, 128b, and 128c) for the 5×5 pixels of the image sensor 104 at $t_1$, $t_2$, and $t_3$ are illustrated in FIG. 8A. The image data can be based on the visible light. The horizontal axis denotes a time.

A reference 127 in FIG. 8B is a signal output from the detector 109, which might be associated with a specified lenslet, corresponding to an area of the 5×5 pixels of the image sensor 104. The signal 127 from the detector 109 can be detected successively, and one of the results between $t_0$ and $t_1$ can be set as angle data at $t_1$. The angle data can be associated with an image data which detected at $t_1$ by the image sensor 104. The image data at $t_1$ can be data which integrated between $t_0$ and $t_1$. The period between $t_0$ and $t_1$ is, for example, 1/60 seconds.

In FIG. 8C, the 5×5 pixels of the SLM corresponding to the specified lenslet is illustrated and the references 129a through 129g are the spot portions which are irradiated by the light that comes from the specified lenslet. The signal intensity can be detected by the signal 127 in FIG. 8B.

Each lenslet of the lenslet array 107 can be associated with each 5×5 pixel of the SLM, and the each 5×5 pixel of the SLM can be driven independently. Based on information (i.e. position and profile) about the spot portions, angle information (130a through 130g) of the light, which is input into the lenslet, can be obtained as illustrated in FIG. 8D. Since a direction of light on the pupil 102a is corresponding to the angle information, finally the image data (128a, 128b, 128c) can be associated with the angle information (i.e. depth information) as described in 131a, 131b, and 131c in FIG. 8E.

A plurality of the angle data can be detected in one frame ($t_0$ to $t_1$, $t_1$ to $t_2$, and $t_2$ to $t_3$), but one angle data of them can be assigned to the one frame. An average of the angle information during the one frame may be assigned to the one frame.

As described above, the image sensor 104 can capture the image 105 of the object 101 at a prescribed time frame, and the photo detector can detect the deflected light 121 to obtain a plurality of the angle data during the prescribed time frame. One angle data among the plurality of the angle data can be associated with one image of the object 101 formed by the image sensor 104 for every prescribed time frame.

In other words, a sampling frequency of the photo detector 109 can be different from a sampling frequency of the image sensor 104. For example, the sampling frequency of the spatial light sensor can be higher than the sampling frequency of the image sensor. By monitoring the signal 127 in FIG. 8B, a change of a scene to be captured may be detected.

When the angular data changes rapidly during the frame period, an appropriate angular data at each frame period can be required. A maximum of the angular data during the frame period can be selected as the appropriate angular data. In an alternative embodiment of the invention, an average of the angular data during the frame period can be selected as the appropriate angular data. Other statistical methods may be used to choose representational angular data. The angular data may also be represented using higher order statistical metrics.

Figure 9:
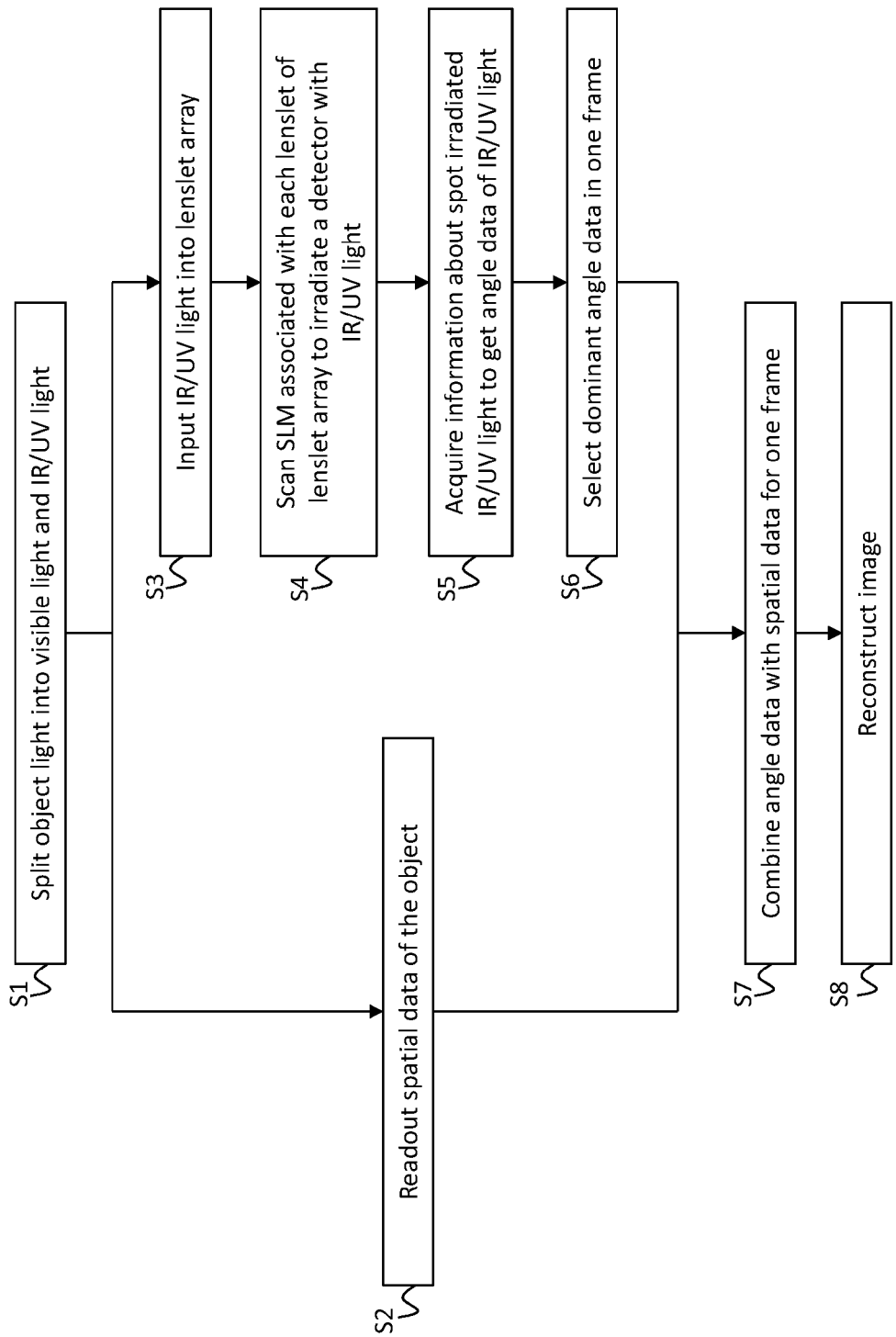
FIG. 9 illustrates a flowchart of an image processing method.

One example of an image processing method is described in FIG. 9. At step S1, an object light which comes from the object 101 through the main lens 102 is split into visible light and IR (infrared radiation) and/or UV light. At step S2, spatial data (image data) can be detected by the image sensor 104. The spatial data is readout for every pixel during one frame period (e.g., 1/60 second).

At step S3, the IR and/or UV light is input into the lenslet array 107. Each lenslet is associated with pixels of the SLM 108, scanning of the SLM is executed to irradiate the photo detector 109 at step S4. The sampling rate of the SLM can be faster than the frame rate of the image sensor 104. Based on the scanning result, information about spot(s), which are irradiated by the IR and/or UV light, of the pixel of the SLM is acquired at step S5. The information can give angle data of the IR and/or UV light. When there are several angle data within in one frame, a representative data value during the one frame can be selected at step S6. The spatial data can be combined with the angle data at step S7. At step 8, for example, based on instructions from a user, an image can be reconstructed.

At step S4, since signals from the photo detector can be output continuously. When the output signal is almost at the same level within the specified threshold, we can assume that the focusing position (spot) and intensity profile of the photo detector won't change. In that case, the scanning of SLM can be omitted until a change of the signal intensity exceeds a threshold value. If the output signal is changed, the scanning step can be executed again.

Figure 10A:
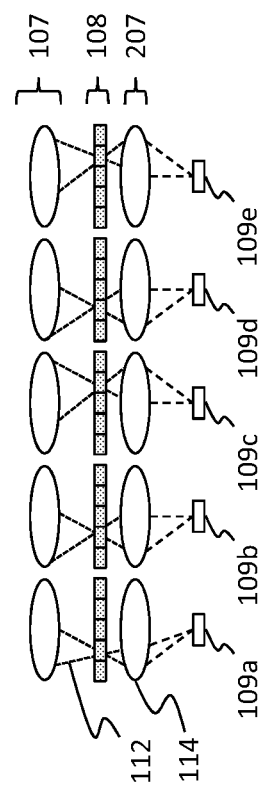
FIGS. 10A and 10B illustrate examples of a light-field sensor.

In FIG. 10A, each lenslet of the lenslet array 107 can be associated with another lenslet of another lenslet array 207 via the SLM 108, and light from the lenslet 207 can be detected by photo detectors (109a, 109b, 109c, 109d, and 109e). The light, which is selected by the beam splitter 103 in FIG. 1, is input into detectors 109a, 109b, and 109c, respectively, via the lenslet 114. By using the lenslet array 207 between the SLM 108 and the photo detectors, the size of the photo detector can be reduced.

Figure 10B:
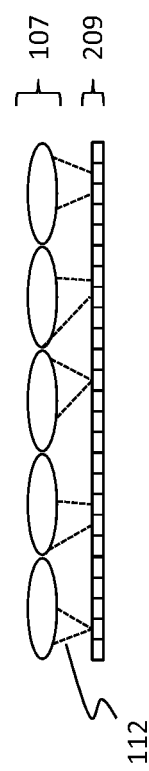

In FIG. 10B, an image sensor 209 (e.g., CMOS array, CCD array, and image pick-up tube) for sensing the angular information is provided under the lenslet array 107 instead of the detector 109 (e.g., photo diode) in FIG. 1. In order to increase the angular resolution in pupil, each pixel of the SLM 108 may be necessary to be reduced. For the reduced size of the pixel of the SLM, such image sensor 209 may be useful to detect the angle information.

To calculate to obtain the angle data based on the detecting result of the light-field sensor 160, Zernike polynomials may be used.

The following are hereby incorporated by reference in their entireties as though fully and completely set forth herein: U.S. Pat. No. 7,936,392 to Ng et al, issued May 3, 2011, U.S. Patent Application Publication No. 2010/0141802 to Knight et al, published Jun. 10, 2010, U.S. Patent Application Publication No. 2010/0026852 to Ng et al, published Feb. 4, 2010, U.S. Pat. No. 7,965,936 to Raskar et al, issued Jun. 21, 2011, U.S. Pat. No. 8,229,294 to Agrawal et al, issued Jul. 24, 2012, U.S. Patent Application Publication No. 2011/0032337 to Ramos et al, published Feb. 10, 2011, U.S. Pat. No. 7,119,842 to Seo, issued Oct. 10, 2006, and U.S. Patent Application Publication No. 2011/0128412 to Milines et al, published Jun. 2, 2011.

While the embodiments according to the present invention have been described with reference to exemplary embodiments, it is to be understood that the present invention is not limited to the above described embodiments. The scope of the following claims is to be accorded the broadest interpretation so as to encompass all such modifications and equivalent structures and functions.

What is claimed is:

1. An apparatus to acquire information about light-field data comprising:
a beam splitter configured to split light, through a lens unit which is connected to the apparatus, from an object into a first light beam and a second light beam;
an image sensor configured to detect the first light beam to form an image of the object;
a light-field sensor, including a lenslet array and a detecting unit to detect the second light beam through the lenslet array, configured to acquire information about the light-field data, the lenslet array including a plurality of lenslets,
wherein a first position where the detecting unit is provided is conjugate to a second position of a pupil of the lens unit; and
an actuator configured to move the detecting unit in order to maintain a conjugate relationship between the first and the second positions when the pupil of the lens unit is moved according to a zooming operation of the lens unit.

2. The apparatus according to claim 1, the detecting unit is moved by the actuator so as to be synchronized with a zooming operation of the lens unit.

3. The apparatus according to claim 1, the actuator is selected from a stepping motor, a micro-electro-mechanical system (MEMS), a voice coil motor, an ultrasonic motor, and a piezoelectric motor.

4. The apparatus according to claim 1, further comprising a controller to control a movement of the actuator and a memory that stores a look-up table related to shift amounts of the detecting unit to be moved by the actuator when the pupil of the lens unit is moved, wherein, after the lens unit has been connected to the apparatus, the controller receives data of the look-up table stored in the memory to control the actuator to move the detecting unit.

5. The apparatus to acquire information about light-field data comprising:
a beam splitter configured to split light, through a lens unit which is connected to the apparatus, from an object into a first light beam and a second light beam;
an image sensor configured to detect the first light beam to form an image of the object; and
a light-field sensor, including a lenslet array and a detecting unit to detect the second light beam through the lenslet array, configured to acquire information about the light-field data, the lenslet array including a plurality of lenslets,
wherein a first position where the detecting unit is provided is conjugate to a second position of a pupil of the lens unit; and
wherein the detecting unit comprises a spatial light modulator and a detector to detect the second light beam coming through the lenslet array, and wherein the first position is a position of the spatial light modulator.

6. The apparatus according to claim 5, wherein the spatial light modulator includes pixel groups, each pixel group having a plurality of pixels.

7. The apparatus according to claim 6, wherein each pixel group of the spatial light modulator is associated with each lenslet.

8. The apparatus according to claim 6, wherein the image sensor captures the image of the object at a prescribed time frame, and the detecting unit detects the second light beam to obtain a plurality of the light-field data for every pixel group during the prescribed time frame.

9. The apparatus according to claim 8, wherein one light-field data among the plurality of the light-field data is associated with one image data point of the object formed by the image sensor for the prescribed time frame.

10. The apparatus according to claim 5, wherein the pupil of the lens unit is formed on the spatial light modulator.

11. The apparatus according to claim 5, wherein the lenslet array is provided so that an image of the object is formed on the lenslet array.

12. The apparatus according to claim 5, wherein the spatial light modulator and the detector are moved according to a zooming operation of the lens unit.

13. The apparatus according to claim 5, wherein every pixel group of the spatial light modulator is driven.

14. The apparatus according to claim 5, wherein the detector is a photo detector.

15. The apparatus according to claim 5, wherein the spatial light modulator is moved by an actuator according to a zooming operation so that a conjugate relationship between the second position of the pupil of the lens unit and a position of the spatial light modulator is maintained.

16. The apparatus to acquire information about light-field data comprising:
- a beam splitter configured to split light, through a lens unit which is connected to the apparatus, from an object into a first light beam and a second light beam;
- an image sensor configured to detect the first light beam to form an image of the object; and
- a light-field sensor, including a lenslet array and a detecting unit to detect the second light beam through the lenslet array, configured to acquire information about the light-field data, the lenslet array including a plurality of lenslets,
- wherein a first position where the detecting unit is provided is conjugate to a second position of a pupil of the lens unit; and
- wherein powers of the plurality of the lenslets are set according to the pupil of the lens unit.

17. The apparatus to acquire information about light-field data comprising:
- a beam splitter configured to split light, through a lens unit which is connected to the apparatus, from an object into a first light beam and a second light beam;
- an image sensor configured to detect the first light beam to form an image of the object; and
- a light-field sensor, including a lenslet array and a detecting unit to detect the second light beam through the lenslet array, configured to acquire information about the light-field data, the lenslet array including a plurality of lenslets,
- wherein a first position where the detecting unit is provided is conjugate to a second position of a pupil of the lens unit; and
- wherein the beam splitter splits the light from the object into visible light to be detected by the image sensor and light, selected from at least one of near infrared light, infrared light, and ultraviolet light, to be detected by the detecting unit.

18. The apparatus according to claim 17, a sampling frequency of the detecting unit is different from a sampling frequency of the image sensor.

19. The apparatus according to claim 18, the sampling frequency of the detector is higher than the sampling frequency of the image sensor.

20. An apparatus to acquire information about light-field data comprising:
- a lens unit;
- a beam splitter configured to split light from an object into a first light beam and a second light beam;
- an image sensor configured to detect the first light beam to form an image of the object;
- a light-field sensor, including a lenslet array and a detecting unit to detect the second light beam through the lenslet array, configured to acquire information about the light-field data, the lenslet array including a plurality of lenslets,
- wherein a first position where the detecting unit is provided is conjugate to a second position of a pupil of the lens unit; and
- an actuator configured to move the detecting unit in order to maintain a conjugate relationship between the first and the second positions when the pupil of the lens unit is moved according to a zooming operation of the lens unit.

21. A method to acquire information about light-field data comprising:
- splitting object light, passing through a lens, unit, into a first light beam and a second light beam;
- detecting the first light beam to capture an image of the object;
- inputting the second light beam into a lenslet array including a plurality of lenslets;
- scanning a spatial light modulator associated with each lenslet of the lenslet array, wherein the spatial light modulator is moved according to a zooming operation of the lens unit so that a conjugate relationship between a position of a pupil of the lens unit and a position of the spatial light modulator is maintained; and
- detecting the second light beam coming through the spatial light modulator to acquire information about light-field data of the object.

22. An apparatus to acquire information about light-field data comprising:
- a lens unit;
- a beam splitter configured to split light from an object into a first light beam and a second light beam;
- an image sensor configured to detect the first light beam to form an image of the object;
- a light-field sensor, including a lenslet array and a detecting unit to detect the second light beam through the lenslet array, configured to acquire information about the light-field data, the lenslet array including a plurality of lenslets,
- wherein a first position where the detecting unit is provided is conjugate to a second position of a pupil of the lens unit; and
- wherein the detecting unit comprises a spatial light modulator and a detector to detect the second light beam coming through the lenslet array, and wherein the first position is a position of the spatial light modulator.

23. An apparatus to acquire information about light-field data comprising:
- a lens unit;
- a beam splitter configured to split light from an object into a first light beam and a second light beam;
- an image sensor configured to detect the first light beam to form an image of the object;
- a light-field sensor, including a lenslet array and a detecting unit to detect the second light beam through the lenslet array, configured to acquire information about the light-field data, the lenslet array including a plurality of lenslets,
- wherein a first position where the detecting unit is provided is conjugate to a second position of a pupil of the lens unit; and
- wherein powers of the plurality of the lenslets are set according to the pupil of the lens unit.

24. An apparatus to acquire information about light-field data comprising:
- a lens unit;
- a beam splitter configured to split light from an object into a first light beam and a second light beam;
- an image sensor configured to detect the first light beam to form an image of the object;
- a light-field sensor, including a lenslet array and a detecting unit to detect the second light beam through the lenslet array, configured to acquire information about the light-field data, the lenslet array including a plurality of lenslets,
- wherein a first position where the detecting unit is provided is conjugate to a second position of a pupil of the lens unit; and
- wherein the beam splitter splits the light from the object into visible light to be detected by the image sensor and light, selected from at least one of near infrared light, infrared light, and ultraviolet light, to be detected by the detecting unit.

\* \* \* \* \*